United States Patent
Neuman et al.

(10) Patent No.: US 11,520,811 B1
(45) Date of Patent: Dec. 6, 2022

(54) MISSION DATA FILE GENERATOR ARCHITECTURE AND INTERFACE

(71) Applicant: BAE SYSTEMS Information and Electronic Systems Integration Inc., Nashua, NH (US)

(72) Inventors: Jeffrey L. Neuman, New York, NY (US); Shuba Koshy, Yonkers, NY (US); Julio E. Lockhart, Secaucus, NJ (US); Matthew J. Perrelli, Clifton, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 223 days.

(21) Appl. No.: 17/140,173

(22) Filed: Jan. 4, 2021

(51) Int. Cl.
*G06F 16/00* (2019.01)
*G06F 16/28* (2019.01)
*G06F 3/0482* (2013.01)
*G06F 9/54* (2006.01)
*G06F 16/22* (2019.01)

(52) U.S. Cl.
CPC .......... *G06F 16/287* (2019.01); *G06F 3/0482* (2013.01); *G06F 9/546* (2013.01); *G06F 16/2246* (2019.01)

(58) Field of Classification Search
CPC .............................. G06F 16/185; G06F 16/282
See application file for complete search history.

(56) References Cited

U.S. PATENT DOCUMENTS

| | | | |
|---|---|---|---|
| 5,421,728 A | 6/1995 | Milden | |
| 8,132,155 B2 | 3/2012 | Gvillo | |
| 9,038,017 B2 * | 5/2015 | Premkumar | G06F 8/34 717/121 |
| 9,323,504 B1 * | 4/2016 | Kinast | G06F 8/35 |
| 9,424,694 B2 | 8/2016 | Senalp et al. | |
| 10,261,761 B1 * | 4/2019 | Kinast | G06F 3/1454 |
| 2011/0153616 A1 * | 6/2011 | Torres | G06F 11/327 707/E17.049 |
| 2013/0185240 A1 * | 7/2013 | Ward | G06F 8/34 706/47 |
| 2014/0101564 A1 * | 4/2014 | Ward | G06F 3/0482 715/741 |
| 2015/0082975 A1 | 3/2015 | Huber et al. | |
| 2017/0160379 A1 | 6/2017 | Markel et al. | |

(Continued)

FOREIGN PATENT DOCUMENTS

CN 105446740 A * 3/2016

OTHER PUBLICATIONS

Tung et al., "Automating Test Case Generation for the New Generation Mission Software System," IEEE Xplore Database, pp. 431-437, Sep. 29, 2022. (Year: 2022).*

*Primary Examiner* — Cheryl Lewis
(74) *Attorney, Agent, or Firm* — KPIP Law, PLLC

(57) ABSTRACT

The system and method for the development and use of an architecture for a Mission Data File Generator (MDFG) for Electronic Warfare (EW) and other systems, which applies state-of-the art software architecture, workflow design, and Graphical User Interface (GUI) design methods. The resulting MDFG tools are user-friendly to the EW Analyst, and allow development of Mission Data Files (MDFs) more quickly. The method and system are substantially more extensible and maintainable than current MDFG tools.

6 Claims, 9 Drawing Sheets

(56) References Cited

U.S. PATENT DOCUMENTS

2017/0293019 A1   10/2017  Caldwell et al.
2020/0034040 A1*  1/2020  Garman .................. G06F 3/064
2020/0166607 A1   5/2020  Jolly et al.

* cited by examiner

MISSION DATA FILE GENERATOR ARCHITECTURE AND INTERFACE

STATEMENT OF GOVERNMENT INTEREST

This disclosure was made with United States Government support under Contract No. 16-G-6101/17-F-0004 awarded by a Classified Agency. The United States Government has certain rights in this disclosure.

FIELD OF THE DISCLOSURE

The present disclosure relates to Mission Data File Generators (MDFG) and more particularly to an MDFG design architecture that can be employed to provide an improved graphical user interface, improved performance, and easier maintenance for legacy MDFG software tools that support various electronic warfare systems.

BACKGROUND OF THE DISCLOSURE

Legacy Mission Data File Generator (MDFG) architecture has been leveraged for numerous years and refactored to meet the needs of various Electronic Warfare (EW) programs. This has caused the relevant source code to be harder to leverage and maintain, and the MDFG tools to be complex and difficult to use. One embodiment of the MDFG architecture of the present disclosure is designed for modern software development, while keeping an awareness of past MDFGs, to create a solution to better handle unknowns in future MDFGs.

Legacy MDFGs have not scaled well and are thus difficult to customize for a particular application and for particular program needs. In contrast, the architecture of the present disclosure allows for ease of customization, allowing for better focus on testing and growth and is scalable, testable, and easily leverageable. This architecture can be utilized by new MDFG development efforts; similarly, legacy MDFG tools can be rearchitected per the framework described by the present disclosure.

Many of the problems with legacy MDFGs stem from the now outmoded architecture, processes, and toolsets that were applied during their original development. As a result, the software source code is difficult to maintain because of the poor way that the logic was partitioned. The archaic source code does not utilize or take advantage of code libraries that enhance the development of code that is cleanly designed and easier to maintain. In particular, toolsets and processes for the development of Graphical User Interface (GUI) source code were immature when the legacy MDFGs were implemented, leaving today's MDFG GUIs burdensome to maintain and enhance.

Wherefore it is an object of the present disclosure to overcome the above-mentioned shortcomings and drawbacks associated with the conventional mission data file generator (MDFG) architecture and interfaces.

SUMMARY OF THE DISCLOSURE

One aspect of the present disclosure is an architecture of a mission data file generator, comprising: a data access layer, a layer in code implementation where external data is stored such as binary inputs and databases; a view component configured to provide a visual layout of a series of graphical user interfaces; a view model component configured to transform model data into view presentation data and separate development of the series of graphical user interfaces from functional logic; and a model component configured to reside in a model manager, which manages model state changes and notifies the view model of the model state changes; the mission data file generator architecture utilizing software plugin architecture and API-based service architecture, which enables controlled interaction between software components and integrates with one or more new software components; the series of graphical user interfaces, comprising: a mission data view configured to show an entirety of a mission data being operated on in a tree-view manner; a function view configured to shows a plurality of functions; and a feedback view configured to provide feedback to an operator, about how the mission data and the plurality of functions are operating together.

One embodiment of the mission data file generator further comprises utilizing spreadsheet-like graphical user interface controls to enhance data management, including data entry, editing, and visualization.

Another aspect of the present disclosure is a generic service architecture, comprising: a service executable driver configured to accept a message ID and a binary buffer from an application via a connection, the generic service architecture being multi-threaded and non-blocking, and configured to forward each message to an appropriate dynamically loaded plugin for domain specific processing; a threading component of the generic service architecture allocates independent lines of processing from which to call a specific plugin needed to respond to a particular received message; and a plugin framework component configured to dynamically load various plugins used to build responses to messages received from the service.

One embodiment of the generic service architecture is wherein the connection is a TCP connection.

Another embodiment of the generic service architecture is wherein a method of communication between various plugins comprising domain specific business logic and the generic service architecture is via shared memory.

Yet another aspect of the present disclosure is a computer program product including one or more non-transitory machine-readable media having instructions encoded thereon that, when executed by a processor, cause the processor to generate a mission data file for a mission that provide a graphical user interface, performing: utilizing a workflow manager as a View presentation that loads one or more plugins, as needed, depending on needed functionality; and calling, via calls, to launch the one or more plugins for data and functionality for a particular system, where a dynamically loaded plugin implements the View and a View-Model portion of a Model-View-View Model architecture.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Many electronic warfare (EW) programs require a Mission Data File Generator (MDFG) tool to generate mission-specific data files that are loaded onto EW systems prior to a mission to optimize the EW systems' performance. The paradigm covered by this disclosure can also be adapted to other domains' (e.g., communications) MDFGs as well. In one embodiment of the present disclosure, legacy MDFGs can be re-architected to comprise a more modern software paradigm, as described herein, that supports an easier and more intuitive workflow for the user. Additionally, the present solution utilizes plug-and-play functionality so that different programs can inject their program-specific needs without affecting the underlying architecture of the system. The present disclosure re-architects current complicated MDFG systems to be simpler with a streamlined overall workflow, as will be described in greater detail herein.

Electronic warfare (EW) systems are used to scan an electronic environment using various technologies to determine what radar signals (e.g., radar) are in an area and whether the source of an illuminating radar, for example, is a friend or foe. The EW system then communicates this information to other EW systems regarding what countermeasure might be deployed, subject to any resource constraints. Generally, prior to a mission, a mission data file (MDF) is created which contains information needed to detect, identify, and counter likely threats while conserving the system resources. EW officers, threat analysts, and the like, use the MDFG system to analyze and create a MDF.

Current EW systems utilize MDFG software that has been leveraged from numerous MDFGs over time to support many different EW processes. In many cases, the current MDFG software is therefore extremely complex, poorly designed, and difficult for EW analysts to use. In some programs, the user utilizes an application such as Microsoft Excel to create a MDF rather than any MDFG software tool at all, which greatly increases the timeline to a solution and reduces the availability of analytical tools that provide required insight for building an MDF.

Figure 1:
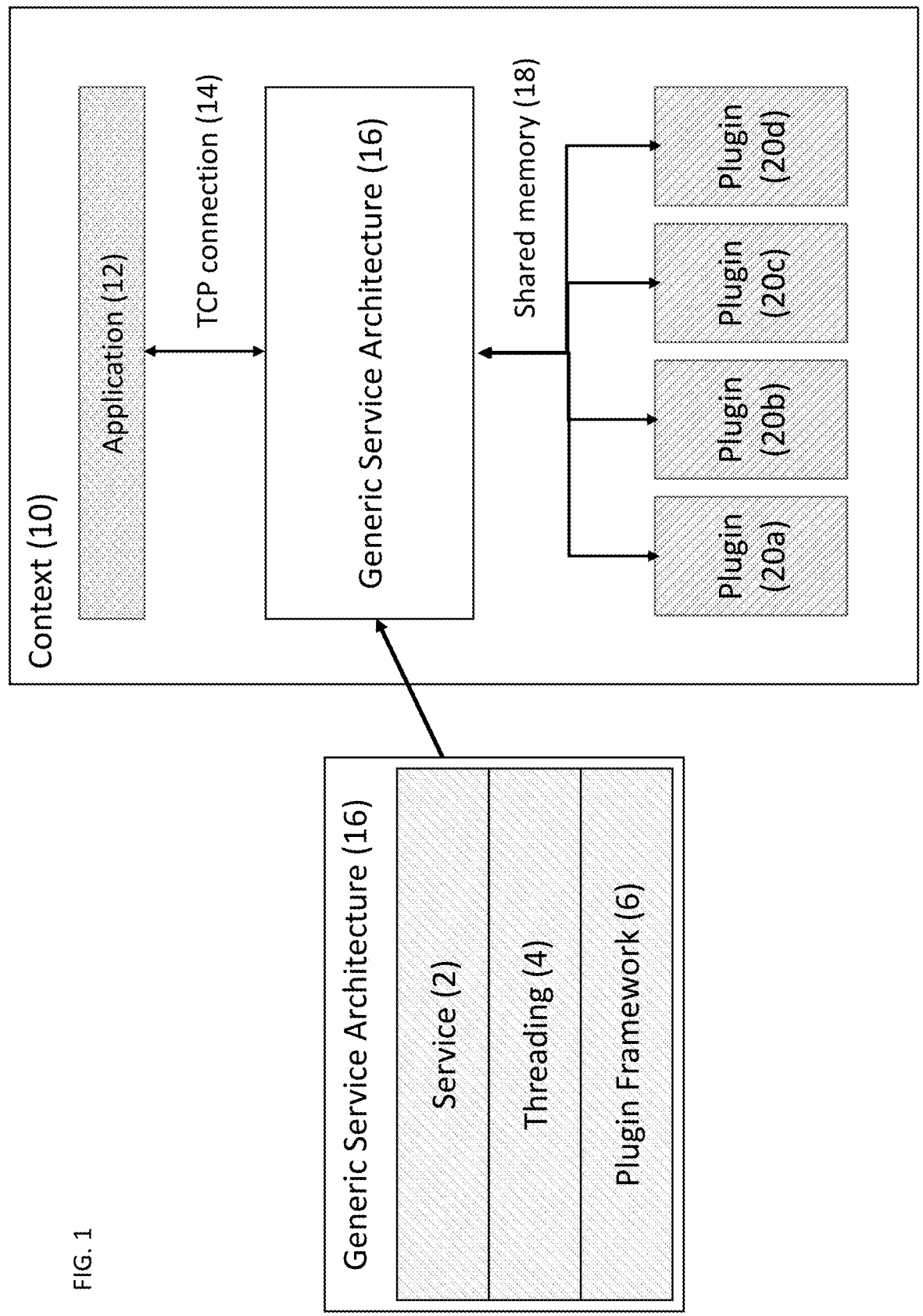
FIG. 1 shows one embodiment of a generic service architecture with the major components of a generic service architecture and the context in which it operates according to the principles of the present disclosure.

Referring to FIG. 1, one embodiment of a generic service architecture according to the principles of the present disclosure is shown. More specifically, one embodiment of a generic service architecture (GSA) 16 comprises a service executable 2 configured to accept a message ID and a binary buffer via TCP connection 14; which is multi-threaded 4, and non-blocking; and forwards the message to an appropriate dynamically loaded plugin 6 for domain specific processing. In one embodiment, the GSA 16 is a software product that facilitates a decoupled connection between domain specific application business logic and the interfaces, graphical or otherwise, used to interact with the business logic. The service 2 is an executable driver of the GSA 16, providing the infrastructure for the GSA to act as a service running in the background and to provide the messaging infrastructure to send and receive messages via TCP 14, or the like. In one embodiment, the threading component 4 of the GSA allocates independent lines of processing from which to call an appropriate plugin needed to respond to a particular received message. The service 2 may receive many messages at a time and it is the threading layer's 4 responsibility to allow for the plurality of messages to be processed simultaneously. In one embodiment, a Plugin Framework component 6 of the GSA 16 dynamically loads the various plugins (e.g., 20a-20d) that will be used to build responses to received messages from the service 2. The separation between the individual plugin that builds a response to a message and the service itself is integral in achieving the generic nature of the GSA. Within some context 10 (e.g., an example environment), the GSA operates with a software product (e.g., application) 12 that sends messages to the GSA via a protocol 14 (e.g., TCP) that allows for communication between the application (software product) and the GSA. In some cases, the method of communication between the various plugins (e.g., 20a-20d) comprising the domain specific business logic and the GSA is via Shared Memory 18. Shared Memory is not a protocol of communication like TCP or UDP; but rather represents the fact that both the various plugins and the GSA operate in the same memory space on a computer and can thus "talk" to one another without a communication protocol. Here, various plugins (20a ... 20d) with domain specific business logic are shown dynamically loaded into the GSA.

Figure 2:
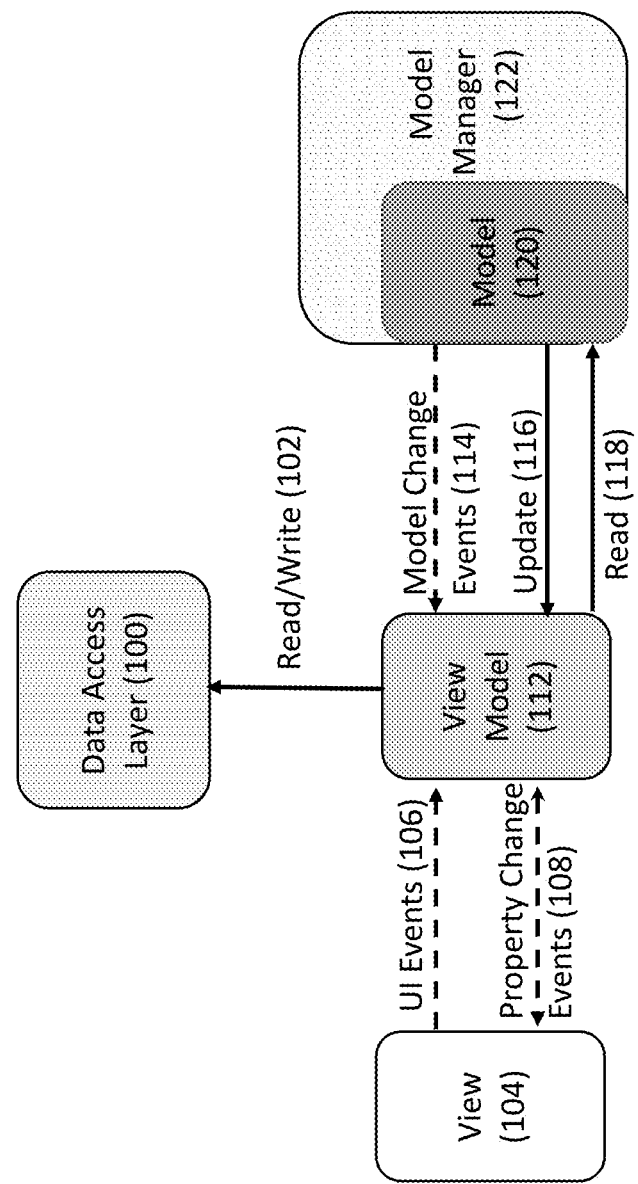
FIG. 2 shows one embodiment of a software architecture model according to the principles of the present disclosure illustrating flow of control through the Model-View-View Model (MVVM) software architecture model that is utilized by the present disclosure.

Referring to FIG. 2, one embodiment of a software architecture model illustrating flow of control through the Model-View-View Model (MVVM) software architecture model according to the principles of the present disclosure is shown. More specifically, this architecture is commonly known as MVVM which is a software architecture schema separated into three main components; Model, View Model, and View, with each having specific responsibilities to execute. This architecture separates the development of GUIs from business logic but binds them together within the View Model. Implementing this type of architecture for MDFG development aids in the ease of incorporating future changes. In this figure, the Data Access Layer 100 represents a layer in code implementation where external data is stored such as independent binary inputs, databases, etc. Read/Write 102 is a command to read or write data/source information. An example of this is if a user clicks on "File Open" and that causes the View Model to make a call to the Data Access Layer to open the file.

Still referring to FIG. 2, the View component 104 is a Model-View-View Model (MVVM) component responsible for visual layout of the one or more graphical user interfaces (GUI) to a user and allows for dynamic exchange of events 108 from the View Model component 112 and also allows for user interface events 106 to be communicated back to the View Model 112. The View Model component 112 transforms Model 120 data such as Model change events 114 as well as updates 116 into view presentation data that is displayed on the View component 104. The View Model 112 also provides Read data 118 back to the Model 120. The Model component 120, in one example, is a MVVM software architectural component where data structures and business logic reside. The Model component 120 resides in the Model Manager 122, which manages the Model component state changes and notifies the View Model 112 of such state changes.

Between the View component 104 and the View Model component 122, UI Events 106 handle event triggers that activate when modifications are made on the GUI (e.g., by a user). Additionally, Property Change Events 108 are internal notifications that are utilized by data binding to synchronize data between the View and the View Model. Between the View Model component 112 and the Model component 120 Model Change Events 114 handle event triggers that activate when modifications are made to the Model. Additionally, Updates 116 are internal notifications that updates were made to data structures contained in the Model component and Read 118 is an internal notification received when data access from the Model component was successful. The interface of the present disclosure represents a synthesis of multiple design patterns to achieve a more efficient overall design for mission data file generators.

Figure 3:
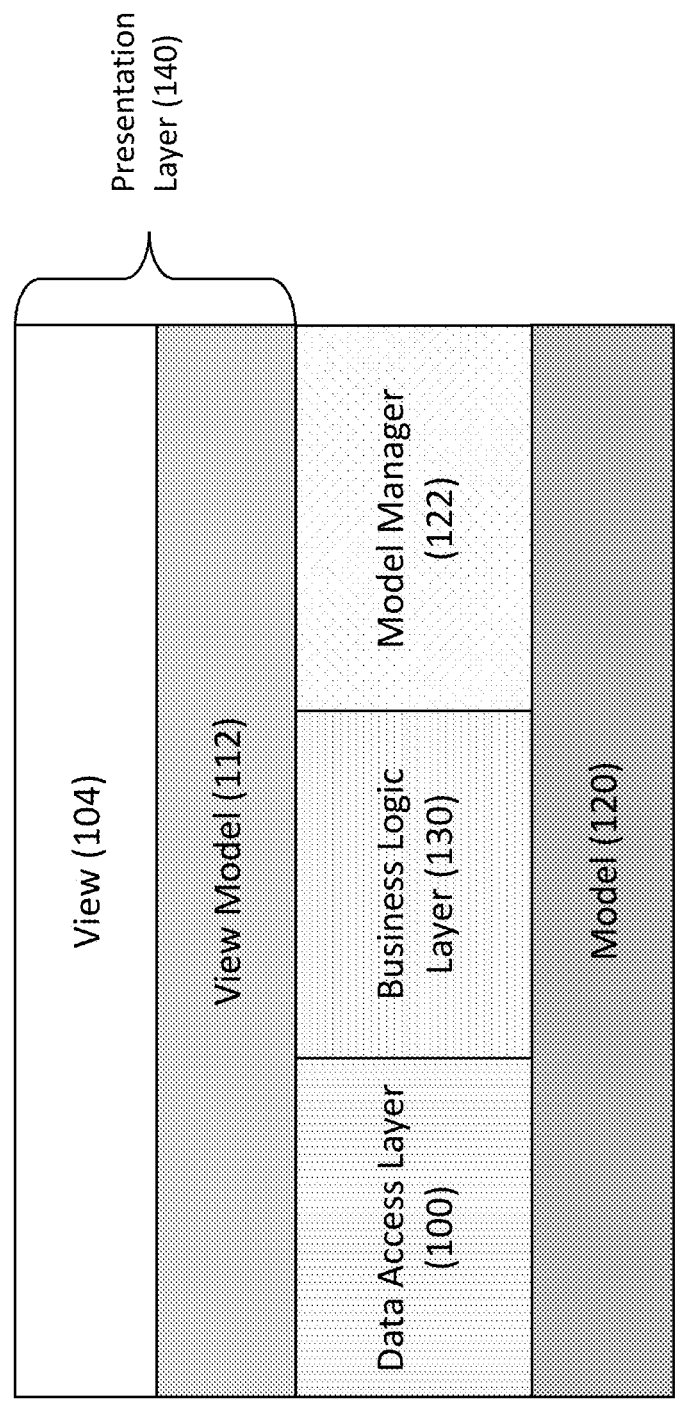
FIG. 3 shows one embodiment of a software architecture model according to the principles of the present disclosure illustrating software layering and structure of the Model-View-View Model software architecture model that is utilized by the present disclosure.

Referring to FIG. 3, one embodiment of a software architecture model illustrating software layering and structure of the Model-View-View Model software architecture model according to the principles of the present disclosure is shown. More specifically, this figure illustrates the layering aspect of the MVVM framework whereas FIG. 2 shows control and data flow within the three main components. In one embodiment of the present disclosure, a View component 104 is the MVVM software architectural component responsible for visual layout of the GUI(s); the View Model component 112 transforms Model data into View presentation data; and the Model component 120 is the MVVM software architectural component where data structures and business logic reside. Between the View Model component 112 and the Model component 120 there is the Data Access Layer 100, which represents a layer in code implementation where external data is stored such as independent binary inputs, files, databases, etc.; the Business Logic Layer 130, which implements specific application algorithms and data objects; and the Model Manager 122, which manages Model state changes and notifies the View Model of such changes. The Presentation Layer 140 is responsible for the display of data to the user.

Figure 4:
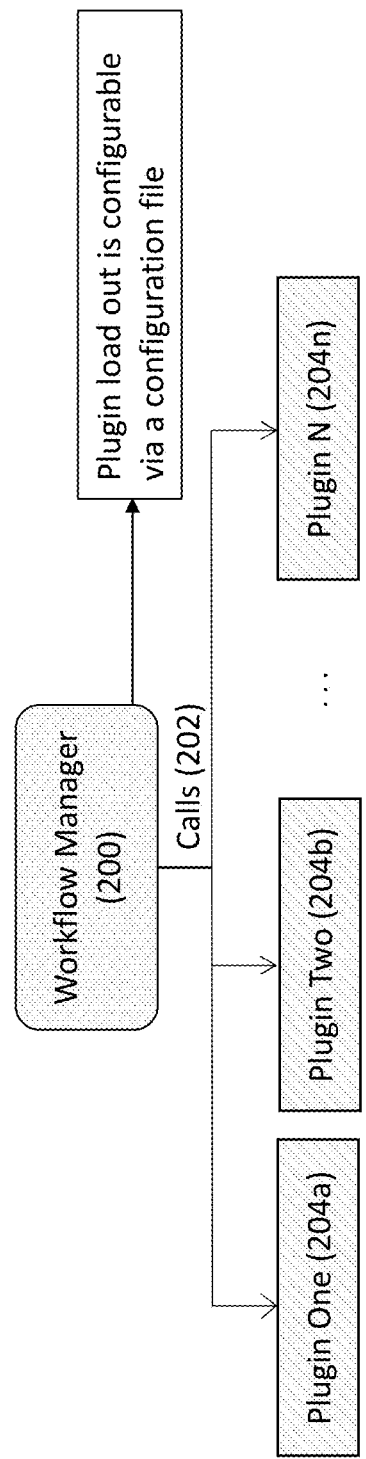
FIG. 4 shows one embodiment of a workflow manager illustrating the modularity achieved by the deployment of plugins according to the principles of the present disclosure.

Referring to FIG. 4, one embodiment of a workflow manager according to the principles of the present disclosure is shown. More specifically, this diagram illustrates the modularity achieved by the deployment of various plugins that is utilized by the present disclosure. A plugin in this generic architecture can implement any particular functionality that is required for building mission data files for any particular EW system. The present framework allows GUIs to be built efficiently in support of particular EW systems by using plugins. In one embodiment of the mission data file generator architecture and interface of the present disclosure, the Workflow Manager 200 is the main View presentation that loads plugins, as needed, for specific functionality. In some cases, calls 202 are a mechanism by which the Workflow Manager 200 launches plugins (e.g., 204*a* . . . 204*n*). 204*a* . . . 204*n* represent plugins utilized as a View presentation for specific data and functionality for the particular system. A dynamically loaded plugin used this way implements the View and View-Model portion of the MVVM architecture described in FIG. 2 above. For example, a Scan Schedule plugin is loaded by the Workflow Manager when the Workflow Manager is started. When the user clicks on the Scan Schedule button, the Scan Schedule plugin is launched. The Scan Schedule plugin utilizes the Model-View-View Model architecture to display Scan Schedule-related data to the user, to apply Scan Schedule-specific algorithms to the data, and to save the resulting data. A similar process would be utilized by other plugins implementing other functionality.

Figure 5A:
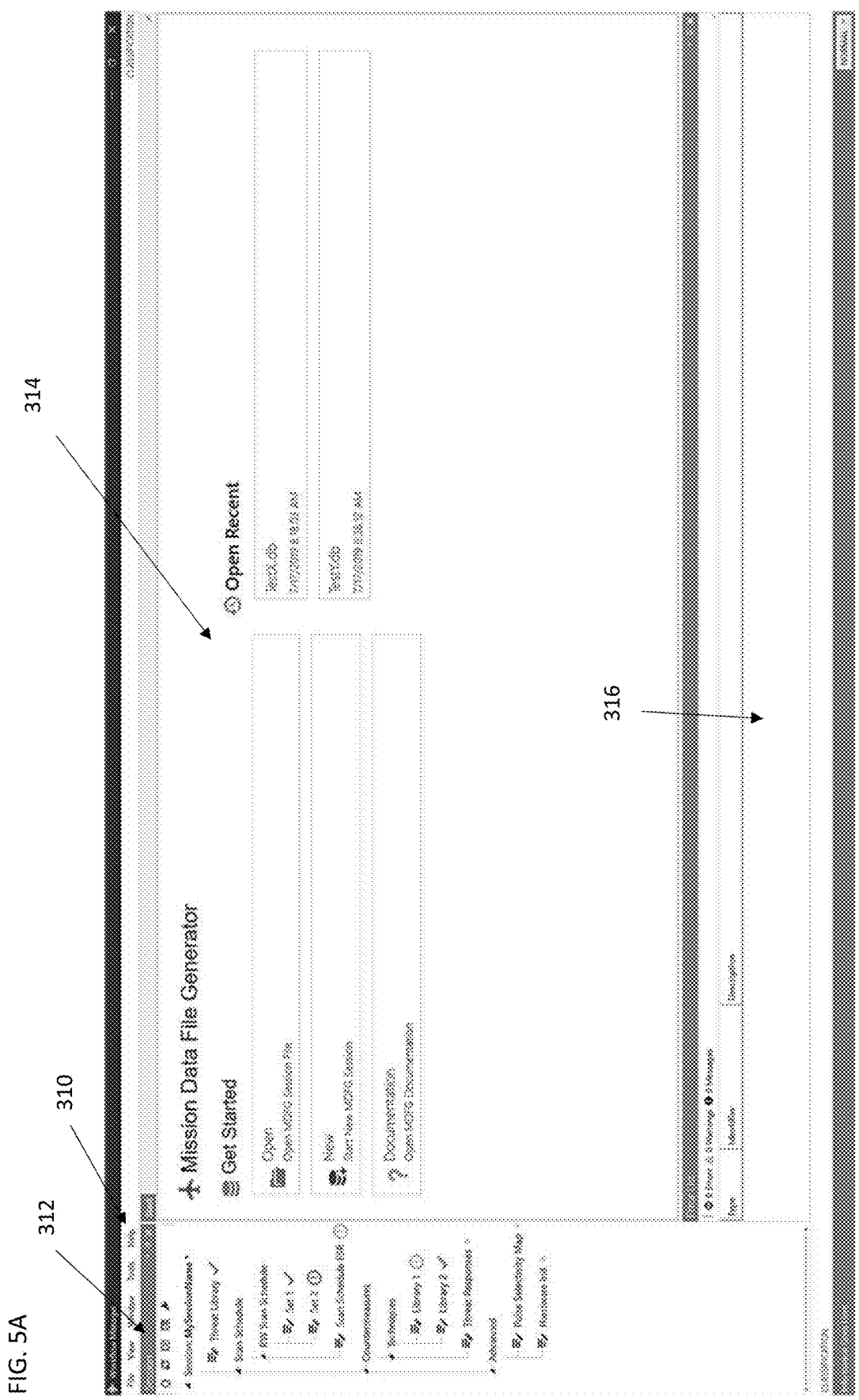
FIG. 5A shows one embodiment of a graphical user interface (GUI) landing page based on the Model-View-View Model and plugin architecture according to the principles of the present disclosure.

Referring to FIG. 5A, one embodiment of a graphical user interface that was built according to the principles of the present disclosure is shown. More specifically, a landing page based on the Model-View-View Model and plugin architecture is shown for one particular EW system. On this landing page, there are three sections of importance—the Session Explorer Pane 312, the Dynamic Workflow Manager Function Pane 314, and the Error Pane 316. Each of these have their own internal implementation of the MVVM architecture implemented along with an event driven system. The Session Pane Explorer 312 is dedicated to displaying to the user an overview of how their mission planning (known as a Session) is going. The menu bar 310 is show at the top of the user interface. Whenever a user modifies their session data, an update event is triggered, which causes the Session Pane Explorer 312 to update and display status information to the user. At the same time, the Error Pane 316 also receives the same update event. When the Error Pane 316 receives the update event, a list of validation errors is displayed based on the data sent from each plugin. The user is then able to filter and sort through the list of errors. The Dynamic Workflow Manager Function Page 314 is responsible for loading different View instances depending on the actions of the user. FIG. 5A depicts the page that is loaded when the Workflow Manager is first launched. When the user decides to start a new Session or open an existing Session in this example, the Dynamic Workflow Manager Function Page 314 is then replaced with FIG. 5B.

Figure 5B:
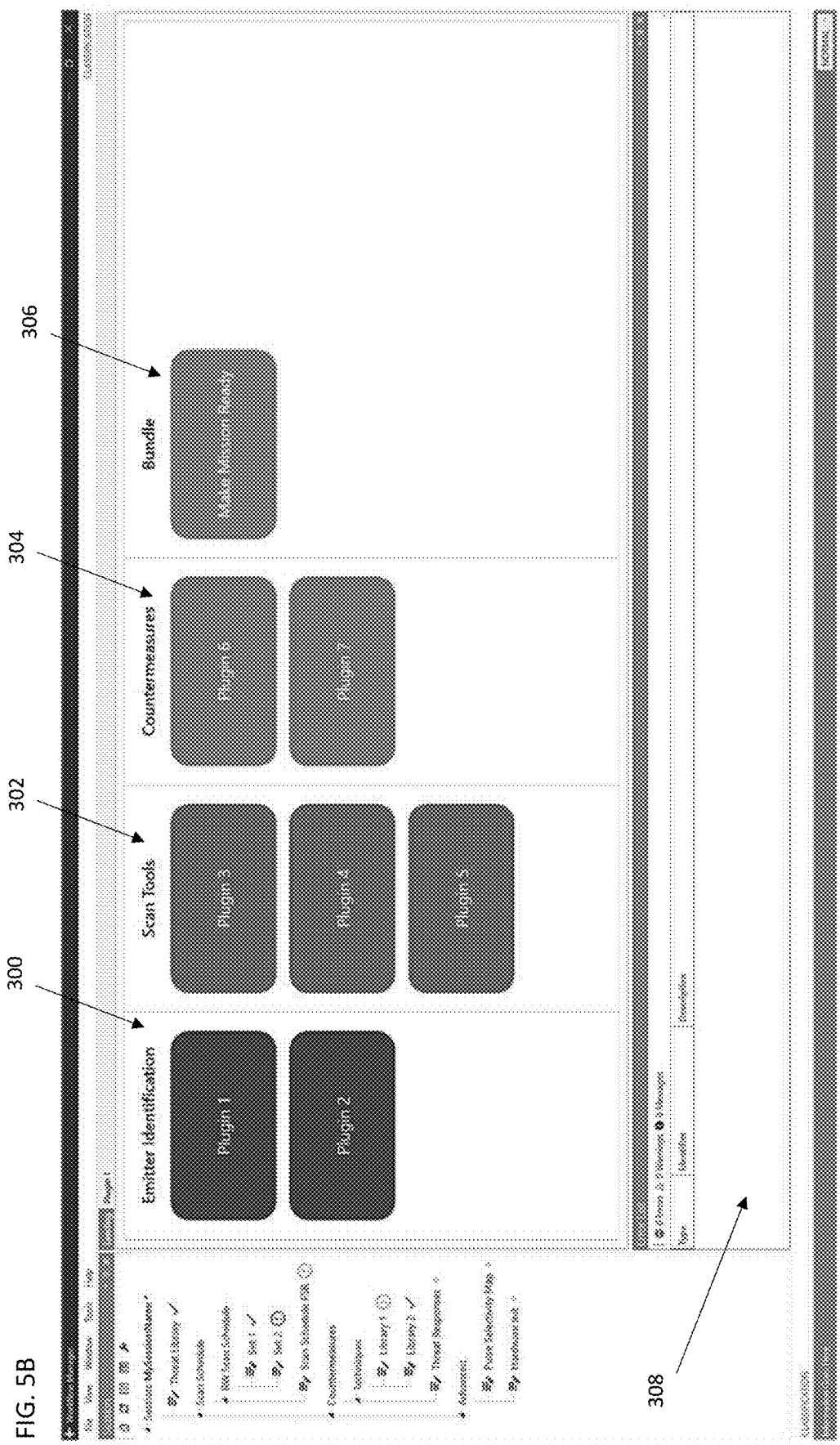
FIG. 5B shows one embodiment of a graphical user interface (GUI) mission management page based on the Model-View-View Model and plugin architecture according to the principles of the present disclosure.

Referring to FIG. 5B, one embodiment of a graphical user interface that was built according to the principles of the present disclosure is shown. More specifically, FIG. 5B illustrates a manifestation of a graphical user interface (GUI) mission management page based on the Model-View-View Model and plugin architecture that is utilized by the present disclosure. The plugins, which implement functionality required to build mission data files for a particular EW system, and that were dynamically loaded upon the startup of the Workflow Manager 200 are displayed here. Each plugin performs a specific function. Each plugin is categorized into a functional group based on the details provided in a configurable configuration file. In this example, the leftmost column 300 groups functions that collectively are required for supporting Emitter Identification. Examples of functions in this group could be Threat Library and Ambiguity Analysis, or the like. Other EW systems may require different functions. A benefit of this architecture is that it is easy to swap in different plugins as needed.

Still referring to FIG. 5B, this represents an instantiation of the architecture described by FIG. 4 for a particular EW system. A grouping of functionalities that an EW analyst performs to generate the portions of the MDF that support Emitter Identification is shown in column 300. A grouping of functionalities than an EW analyst performs to generate the portions of the MDF that support scanning of the electromagnetic environment is shown in column 302. A grouping of functionalities than an EW analyst performs to generate the portions of the MDF that support electronic countermeasures that could be utilized against hostile systems is shown in column 304. A grouping of functionalities than an EW analyst collects and creates tables that comprise the MDF and process them into their final formats to be used is shown in column 306. A portion of the user interface 308 is shown which is used to provide real-time messages regarding the validity of the MDF tables.

Figure 5C:
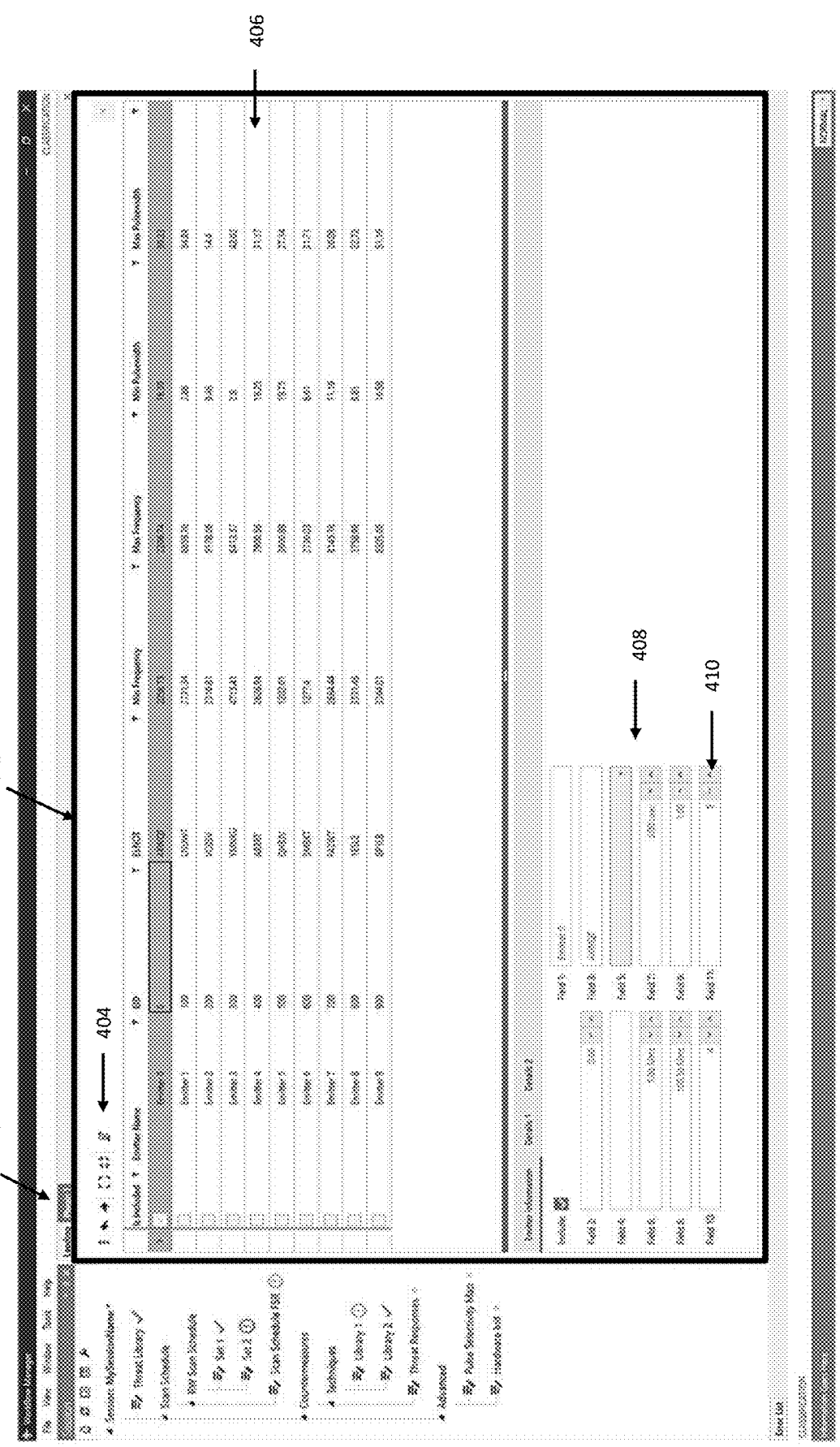
FIG. 5C shows one embodiment of a graphical user interface (GUI) data management page based on the Model-View-View Model and plugin architecture according to the principles of the present disclosure.

Referring to FIG. 5C, one embodiment of a graphical user interface according to the principles of the present disclosure is shown. More specifically, a data management page based on the Model-View-View Model and plugin architecture is shown here for a specific plugin. FIG. 5B demonstrates how the plugins that were dynamically loaded are displayed. Clicking on one of the buttons presents to the user a new Tab Page 400 for the dynamically loaded plugin. What is displayed to the user is the result of the MVMM architecture for that plugin. In this example, clicking on the 'Plugin 1' Tab Page 400 presents to the user the View portion 402 of the plugin. Each View 402 of a plugin is constructed differently to manipulate the Model Manager (see, e.g., FIG. 3). What functionality a View 402 plugin implements will depend on the EW system that the MDFG is supporting. Here, for example, 402 is a plugin that implements the Threat Library function, which is needed by one particular EW system to allow the user to modify threat parametrics for a Session. Displayed in this figure are three main sections, each with its own capabilities: a toolbar 404, a grid-view 406, and a Tab Control 408. The toolbar 404 presents several quick options for the user such as Undo and Redo buttons and an import button, which allows the user to import data from an external resource. The grid-view 406 displays an overview of the list of threat data that has been created and modified. The grid-view allows the user to sort and filter each column to their liking. Rows that contain any validation errors are displayed with a red background to call attention to the user. Clicking on a single row opens the Tab Control 408 at the bottom. This is where the user can make modifications to a specific threat entry. The Tab Control 408 is broken up into several tabs to group common data fields together (i.e., Scan Parametric data will be grouped together while Threat ID parametrics will be grouped in a separate tab, for example). Numerical textboxes 410 are implemented to help the user enter data. Real-time validation is included in these numerical textboxes 410 such that whenever information is entered which breaks a rule defined for that data, an error is noted.

Figure 6A:
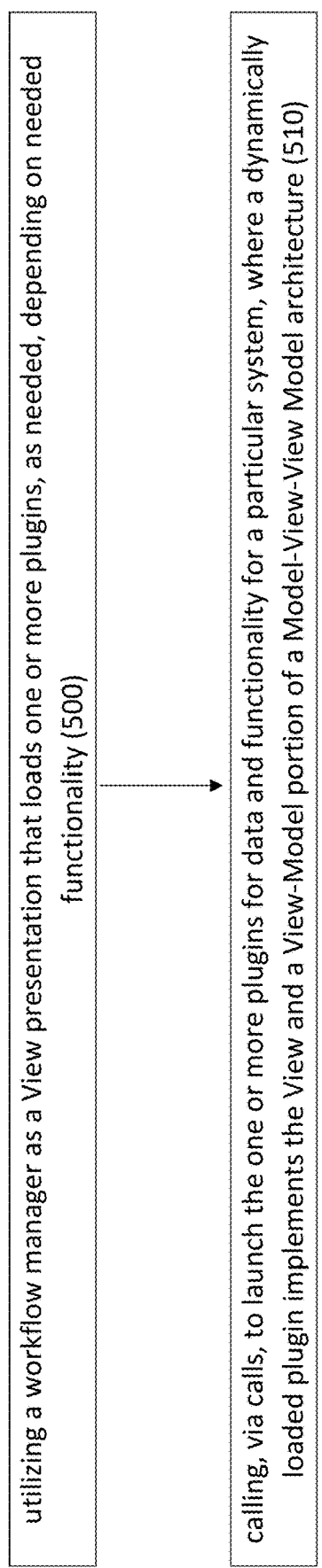
FIG. 6A shows a flow chart of one embodiment of a method of generating a mission data file according to the principles of the present disclosure.

Referring to FIG. 6A, a flow chart of one embodiment of a method of generating a mission data file according to the principles of the present disclosure is shown. More specifically, initially utilizing a workflow manager as a View presentation that loads one or more plugins, as needed, depending on needed functionality is performed (500). Subsequently, calling, via calls, to launch the one or more plugins for data and functionality for a particular system, where a dynamically loaded plugin implements the View and a View-Model portion of a Model-View-View Model architecture is used (510). One example of this is described in FIG. 6B, for illustrative purposes only.

Figure 6B:
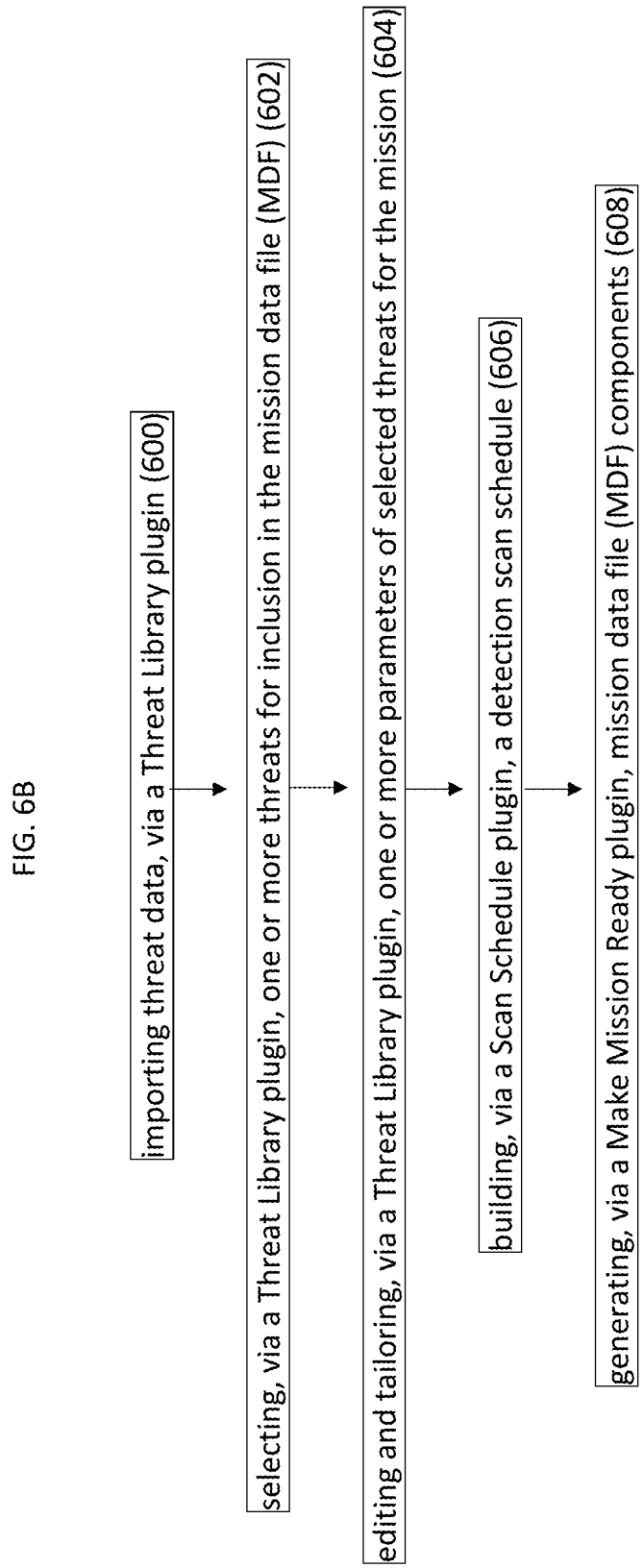
FIG. 6B shows a flow chart of one embodiment of a method of generating a mission data file for a particular application according to the principles of the present disclosure.

Referring to FIG. 6B, a flow chart of one embodiment of a method of generating a mission data file for one particular EW system according to the principles of the present disclosure is shown. For other EW systems, a different workflow could be designed that the architecture would also be able to support. More specifically in this example, a method of generating a mission data file for a mission, begins by importing threat data, via a Threat Library plugin 600. Then, the system selects, via a Threat Library plugin, one or more threats for inclusion in a mission data file (MDF) 602. The Threat Library plugin allows the user to then edit and tailor one or more parameters of selected threats for the mission 604. A Scan Schedule plugin then builds a detection scan schedule 606 and generates, via a Make Mission Ready plugin, the components of a mission data file (MDF) 608. The method of generating a mission data file for a mission may further comprise building countermeasure techniques, via a Technique Library Editor plugin. In some cases, the method further comprises associating countermeasure techniques to threats, via a Threat Response Editor plugin. In certain embodiments, the Make Mission Ready plugin further bundles the mission data file (MDF) components together. In all cases, the architecture in the present disclosure easily supports the inclusion and exclusion of functionality plugins, as needed.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. Architecture of a mission data file generator, comprising:
    a data access layer, a layer in code implementation where external data is stored such as binary inputs and databases;
    a view component configured to provide a visual layout of a series of graphical user interfaces;
    a view model component configured to transform model data into view presentation data and separate development of the series of graphical user interfaces from functional logic; and
    a model component configured to reside in a model manager, which manages model state changes and notifies the view model of the model state changes;
    the mission data file generator architecture utilizing software plugin architecture and API-based service architecture, which enables controlled interaction between software components and integrates with one or more new software components;
    the series of graphical user interfaces, comprising:
    a mission data view configured to show an entirety of a mission data being operated on in a tree-view manner;
    a function view configured to shows a plurality of functions; and
    a feedback view configured to provide feedback to an operator, about how the mission data and the plurality of functions are operating together.

2. The mission data file generator of claim 1, further comprising utilizing spreadsheet-like graphical user interface controls to enhance data management, including data entry, editing, and visualization.

3. A generic service architecture, comprising:
    a service executable driver configured to accept a message ID and a binary buffer from an application via a connection,
    the generic service architecture being multi-threaded and non-blocking, and configured to forward each message to an appropriate dynamically loaded plugin for domain specific processing;
    a threading component of the generic service architecture allocates independent lines of processing from which to call a specific plugin needed to respond to a particular received message; and
    a plugin framework component configured to dynamically load various plugins used to build responses to messages received from the service.

4. The generic service architecture of claim 3, wherein the connection is a TCP connection.

5. The generic service architecture of claim 3, wherein a method of communication between various plugins comprising domain specific business logic and the generic service architecture is via shared memory.

6. A computer program product including one or more non-transitory machine-readable media having instructions encoded thereon that, when executed by a processor, cause the processor to generate a mission data file for a mission that provide a graphical user interface, performing:
    utilizing a workflow manager as a View presentation that loads one or more plugins, as needed, depending on needed functionality; and
    calling, via calls, to launch the one or more plugins for data and functionality for a particular system, where a dynamically loaded plugin implements the View and a View-Model portion of a Model-View-View Model architecture.

* * * * *